No. 881,772. PATENTED MAR. 10, 1908.
H. CANNEY.
REEL FOR CLOTHES LINES.
APPLICATION FILED APR. 26, 1907.
2 SHEETS—SHEET 1.
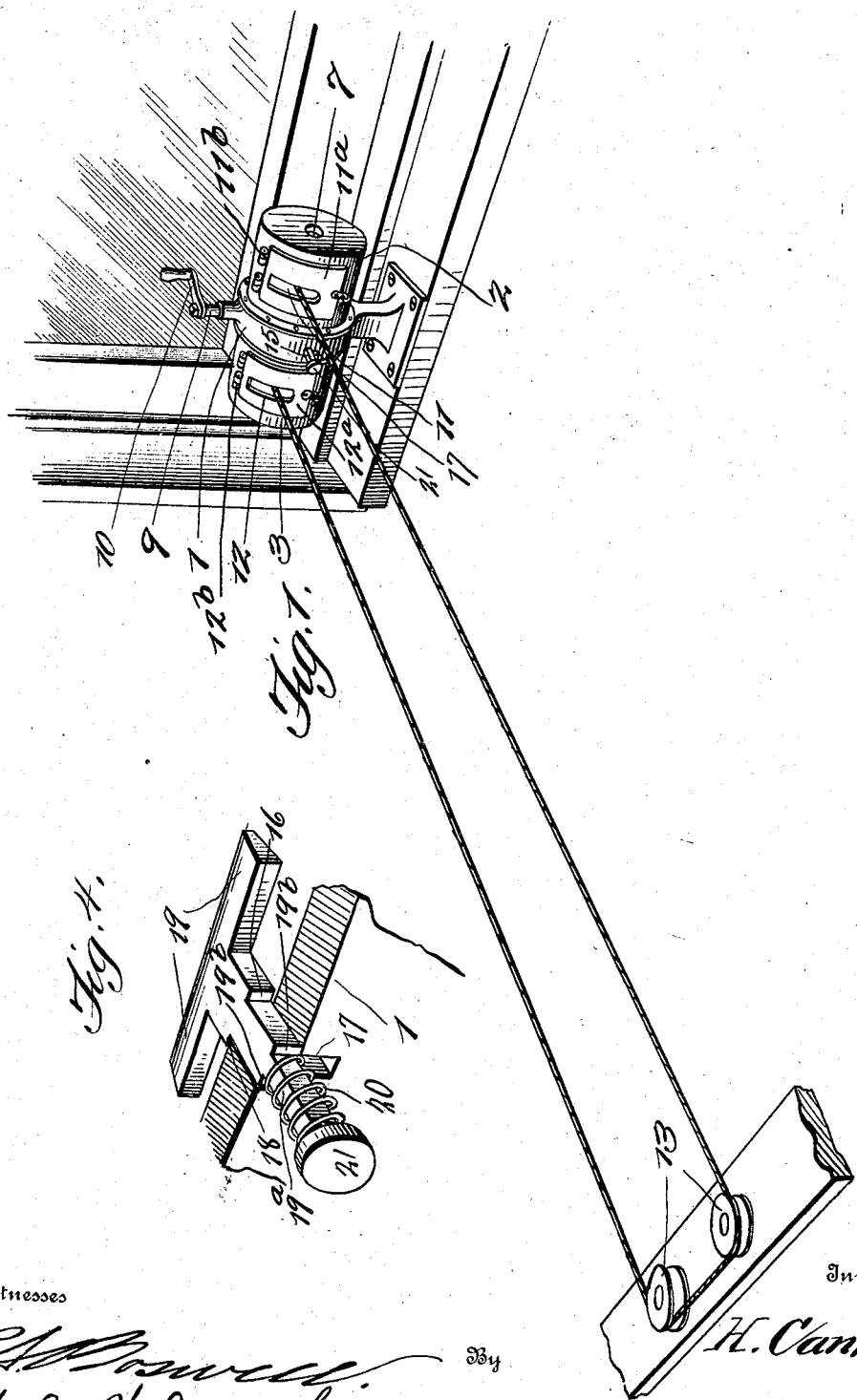
Witnesses
Inventor
H. Canney.
By Dean Swift Attorney No. 881,772. PATENTED MAR. 10, 1908.
H. CANNEY.
REEL FOR CLOTHES LINES.
APPLICATION FILED APR. 26, 1907.
2 SHEETS—SHEET 2.
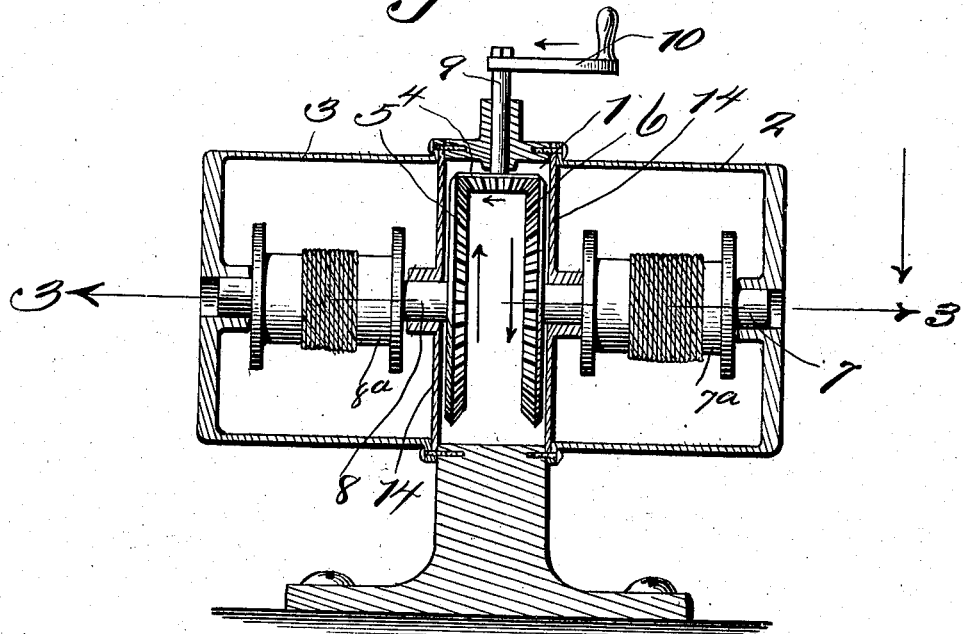
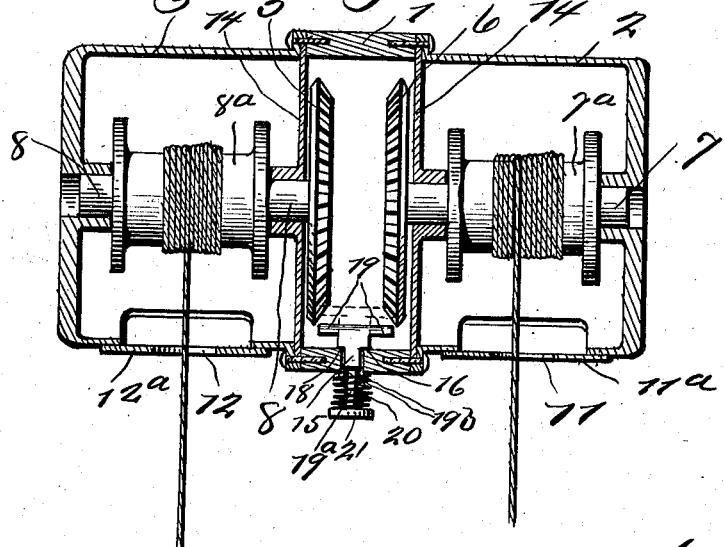
Witnesses
Inventor
H. Canney.
By Dean Swift
Attorney

UNITED STATES PATENT OFFICE.

HARRIET CANNEY, OF COLUSA, CALIFORNIA.

REEL FOR CLOTHES-LINES.

No. 881,772.  Specification of Letters Patent.  Patented March 10, 1908.

Application filed April 26, 1907. Serial No. 370,392.

*To all whom it may concern:*

Be it known that I, HARRIET CANNEY, a citizen of the United States, residing at Colusa, in the county of Colusa and State of California, have invented a new and useful Reel for Clothes-Lines; and I do hereby declare the following to be a full, clear, and exact description of the invention, such as will enable others skilled in the art to which it appertains to make and use the same.

The invention relates to a clothes line reel and has for its object to provide a device of this character which can be secured to the window of a house, and which having a cable in the form of a loop, is adapted to carry a line of clothes out to expose the same to the sun and to draw in the dry line at the same time.

The invention consists in the construction and novel arrangement of parts hereinafter described, and shown and particularly pointed out in the appended claims.

In the drawing, Figure 1 is a perspective view of a reel constructed in accordance with this invention. Fig. 2 is a vertical sectional view through the reel. Fig. 3 is a sectional view on line 3—3 of Fig. 2. Fig. 4 is a detail perspective view of the locking pin.

Referring to the drawings, 1, 2 and 3, designate the three sections of the center and ends of the casing, for the reel which is connected in any suitable manner. The reel is operated by a pinion 4 which meshes with gear wheels 5 and 6, to which are secured shafts 7 and 8. The pinion 4 is provided with a vertical shaft 9 having a crank 10 by which the device is operated.

It will be seen upon examination of the drawings, that the cable is connected to and wound about the drums $7^a$ and $8^a$, and as the crank 10, is rotated thus imparting movement to said drums, the cable will be wound up on one drum and unwound from the other drum.

The casings are provided with slots 11 and 12 through which the cable passes when it is being operated, and the loop passes around pulleys 13. In practice, the clothes are arranged on one cable, and the cable is unwound further and others are added until the line is full to the end. They remain there until dry, then that line is wound up, and the clothes taken off, and as the dry clothes are being taken off, other clothes to be dried can be put on the unwinding cable, as will be readily understood. In order to prevent the cable from becoming entangled with the gear wheels, disks 14 are provided, having openings through which pass shafts 7 and 8.

The slots 11, and 12 are formed in the doors $11^a$ and $12^a$ which are provided for the purpose of giving access to the interior of the casing; these doors are hinged at $11^b$ and $12^b$, as clearly shown in Fig. 1. When it is desired to lock the wheels 5 and 6 against rotation, the T-shaped locking pin 19 is pressed inwardly so as to engage the teeth of said wheels, after which, the shank $19^a$ is depressed into the narrow portion of the recess 17 of the casing, thus locking the wheels as will be clearly observed. This action allows the shoulders $19^b$ of said shank to engage the inner face of the casing so as to prevent outward movement of the pin. The said shank is also provided with additional shoulders 16 and 18 which engage the inner circumference of the casing so as to limit the outward movement of the said pin. The shank of said pin is provided with a head 21 between which and the casing a spring 20 is disposed for the purpose of keeping the pin outwardly positioned. From the foregoing it will be seen how the said gears are locked.

What I claim is,

A device of the class described, having a casing, shafts journaled therein, a crank shaft intergeared with the aforesaid shafts, the first-named shafts being equipped with drums, around which a cable is wound, said casing having a recess provided with a reduced extension, a spring-actuated T-shaped locking pin, having a plurality of opposite shoulders and a reduced portion, the reduced extension 17 of the recess being adapted to receive the reduced or narrowest portion of said locking pin, substantially as shown and described.

In testimony whereof I have signed my name to this specification in the presence of two subscribing witnesses.

HARRIET CANNEY.

Witnesses:
 J. S. O'ROURKE,
 OWEN SULLIVAN.